United States Patent [19]
Lai

[11] Patent Number: 5,607,173
[45] Date of Patent: Mar. 4, 1997

[54] ADJUSTABLE PARKING FRAME OF BICYCLE

[76] Inventor: Yung-Hsin Lai, No. 302-1, Chang Yuan Road, Chang Sha Village, Hwatan Hsiang, Changhua, Taiwan

[21] Appl. No.: 507,020

[22] Filed: Jul. 25, 1995

[51] Int. Cl.[6] ................................................. B62H 1/06
[52] U.S. Cl. .......................... 280/293; 280/304; 74/586; 403/104; 403/109
[58] Field of Search .................................. 280/293, 298, 280/301, 304, 288.4; 248/188.5, 346.01; 74/586; 403/93, 103, 104, 109

[56] References Cited

U.S. PATENT DOCUMENTS

| | | | |
|---|---|---|---|
| 1,376,139 | 4/1921 | Del Porto | 403/104 |
| 3,712,640 | 1/1973 | Shipman et al. | 280/304 X |
| 4,817,977 | 4/1989 | Bookbinder | 280/304 |

FOREIGN PATENT DOCUMENTS

| | | | |
|---|---|---|---|
| 11425 | 5/1902 | United Kingdom | 280/304 |

Primary Examiner—Brian L. Johnson
Assistant Examiner—Victor E. Johnson
Attorney, Agent, or Firm—Browdy and Neimark

[57] ABSTRACT

An adjustable bicycle parking frame comprises a fastening plate, an inner rod, a support rod and an adjustment rod. The parking frame can be turned and located by a spring, an outer tube and a fitting ring, which are disposed between the fastening plate and the inner rod. Located at the bottom of the inner rod is a receiving space having on the top edge thereof a round hole in which a spring and a retaining block are received. The support rod is provided at the bottom thereof with a support block and at the top thereof with an outer threaded portion. The adjustment rod is provided axially with a fitting hole having therein at the midpoint thereof an inner threaded portion engageable with the outer threaded portion of the support rod. The fitting hole is provided therein at the top end thereof with a retaining groove engageable with the retaining block of the inner rod when the inner rod is fitted into the fitting hole of the adjustment rod. The length adjustment of the support rod is attained by turning the adjustment rod.

3 Claims, 2 Drawing Sheets

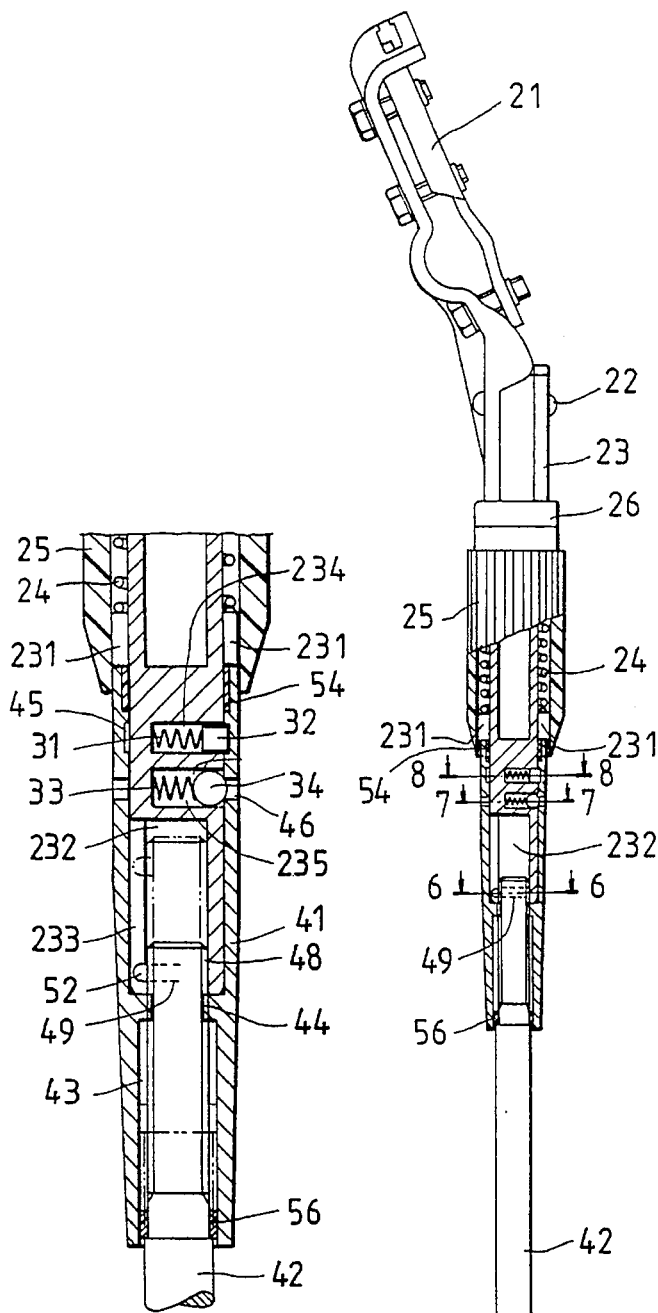
FIG. 5
FIG. 3
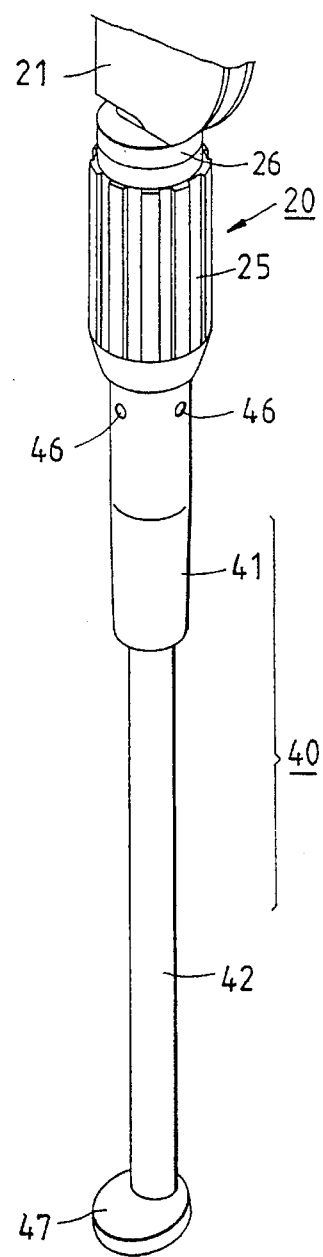
FIG. 2

The present invention relates generally to a bicycle, and more particularly to an adjustable bicycle parking frame.

ADJUSTABLE PARKING FRAME OF BICYCLE

FIELD OF THE INVENTION

The present invention relates generally to a bicycle, and more particularly to an adjustable bicycle parking frame.

BACKGROUND OF THE INVENTION

As shown in FIG. 1, a prior art bicycle parking frame comprises mainly a plate 11 and a support rod 12. Such a bicycle parking frame as described above is intended to support the bicycle on the ground in a slightly tilting manner. The plate 11 is fastened securely with the bicycle frame. The support rod 12 is fastened with the plate 11 such that the support rod 12 can be caused to swivel so as to support the parked bicycle in a slightly tilting manner. The optimum inclination, at which the bicycle is parked, ranges between 6 and 12 degrees. In other words, a bicycle which is parked at the inclination smaller than 6 degrees or greater than 12 degrees is vulnerable to toppling.

It is necessary to provide a bicycle with a parking frame of an appropriate size in accordance with the size of the bicycle frame. There are bicycle frames of various sizes. Accordingly, the bicycle parking frames of various sizes must be made. Such a manufacturing practice of making the bicycle parking frames of various sizes is not cost-effective. In addition, the prior art bicycle parking frames are defective in design in that they do not allow a bicyclist to adjust at will the inclination at which the bicycle is parked.

With a view to overcoming the drawbacks of the prior art bicycle parking frames described above, a variety of new and improved bicycle parking frames were disclosed. The known bicycle parking frames are adjustable in length; nevertheless they are rather complicated in construction and can not be made economically.

SUMMARY OF THE INVENTION

It is therefore the primary objective of the present invention to provide an adjustable bicycle parking frame which can be easily adjusted in length without the use of a hand tool and made economically.

It is another objective of the present invention to provide an adjustable bicycle parking frame which is rather exquisite in construction and gives an added value to a bicycle to which the parking frame is fastened.

The foregoing objectives of the present invention are accomplished by the adjustable bicycle parking frame, which comprises mainly a fastening plate provided at the bottom thereof with an inner rod which is in turn provided on the outer edge of the midpoint thereof with two protuberances having a flat top. Located between two protuberances and the fastening plate are a spring, an outer tube and a collar for enabling the parking frame to swivel and locate.

The inner rod is provided at the bottom thereof with a receiving space having axially a sliding slot. Located between the top edge of the receiving space and two protuberances is a first round hole in which a spring and a retaining block are received. A support rod is provided at the bottom thereof with a support block and at the top thereof with an outer threaded portion having on the top thereof a circular hole. An adjustment rod of a cylindrical construction is provided axially with a fitting hole having at the midpoint of the inner wall thereof an inner threaded portion of a smaller diameter. The inner threaded portion of the adjustment rod is engageable with the outer threaded portion of the support rod. A pin is received in the circular hole of the outer threaded portion of the support rod. The fitting hole of the adjustment rod is provided on the inner wall of the top end thereof with a retaining groove engageable with the retaining block of the first round hole of the inner rod. The parking frame can be adjusted in length by rotating the adjustment rod so as to cause the inner threaded portion of the adjustment rod to move in relation to the outer threaded portion of the support rod.

The foregoing objectives, features, functions and advantages of the present invention will be more readily understood upon a thoughtful deliberation of the following detailed description of an embodiment of the present invention in conjunction with the accompanying drawings.

BRIEF DESCRIPTION OF THE DRAWINGS

FIG. 2 shows a perspective view of an adjustable bicycle parking frame embodied in the present invention.

FIG. 3 shows a longitudinal sectional view of the adjustable bicycle parking frame of the present invention.

FIG. 5 shows an enlarged sectional view of the adjustment member of the present invention.

DETAILED DESCRIPTION OF THE INVENTION

As shown in FIGS. 2–8, the adjustable bicycle parking frame embodied in the present invention comprises a fastening member 20 and an adjustment member 40.

Figure 1:
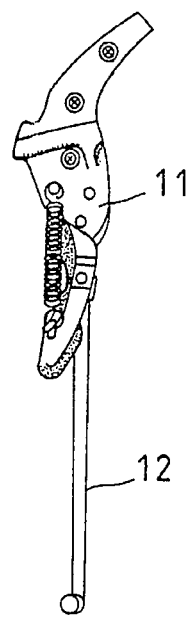
FIG. 1 shows a perspective view of a bicycle parking frame of the prior art.
Figure 6:
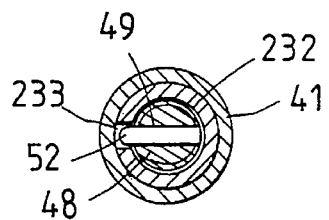
FIG. 6 shows a sectional view of a portion taken along the line 6—6 as shown in FIG. 3.
Figure 7:
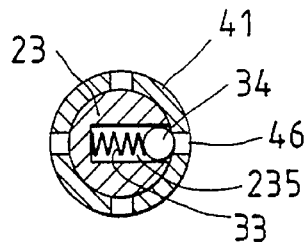
FIG. 7 shows a sectional view of a portion taken along the line 7—7 as shown in FIG. 3.
Figure 8:
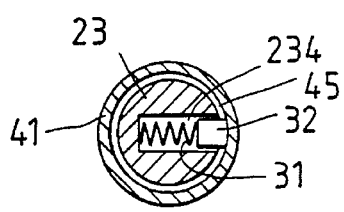
FIG. 8 shows a sectional view of a portion taken along the line 8—8 as shown in FIG. 3.

The fastening member 20 comprises a fastening plate 21 of a metal material. The fastening plate 21 is fastened securely with the bicycle frame and is fastened at the bottom thereof with an inner rod 23 by means of a locating pin 22. The inner rod 23 is provided on the outer surface of the midpoint thereof with two protuberances 231, which have respectively a flat top and are opposite in location to each other. The protuberances 231 are urged by a spring 24 which is fitted into an outer tube 25 and is provided at the top end thereof with a collar 26 fitted thereover. The bicycle parking frame of the present invention can be caused to swivel and locate, thanks to the fastening plate 21, the inner rod 23, the spring 24, the outer tube 25 and the collar 26, which are all similar in construction and function to those of the bicycle parking frames of the prior art and will not be therefore described further. The inner rod 23 is provided at the bottom end thereof with a receiving space 232 of a predetermined depth. The receiving space 232 is provided axially on one side thereof with a sliding slot 233, as shown in FIG. 6, and is further provided on the top edge thereof with two circular holes 234 and 235 which are located on the peripheral surfaces located between the top edge of the receiving space 232 and two protuberances 231. The circular hole 234 is intended to receive therein a spring 31 and a retaining block 33 while the circular hole 235 is to accommodate therein a spring 33 and a steel ball 34, as shown in FIGS. 7 and 8.

The adjustment member 40 comprises an adjustment rod 41 and a support rod 42. The adjustment rod 41 has a fitting hole 43 which is provided on the inner wall of the midpoint thereof with an inner threaded portion 44 smaller in the inner diameter. The fitting hole 43 is provided in the upper end thereof with a pivoting ring 54 which is made of a plastic material and is fitted thereinto. The pivoting ring 54 has an inner diameter slightly greater than the outer diameter of the inner rod 23 and is provided on the inner wall of the lower portion thereof with a retaining groove 45. Located equidistantly on the peripheral surface between the retaining groove 45 and the inner threaded portion 44 are four round through holes 46. The support rod 42 is provided at the bottom thereof with a support block 47 and at the top thereof with an outer threaded portion 48 engageable with the inner threaded portion 44 of the adjustment rod 41. The outer threaded portion 48 is provided at the top thereof with a circular hole 49 and at the bottom thereof with a plastic pivoting jacket 56 fitted thereover. The pivoting jacket 56 has an outer diameter slightly smaller than the inner diameter of the fitting hole 43 of the adjustment rod 41.

Figure 4:
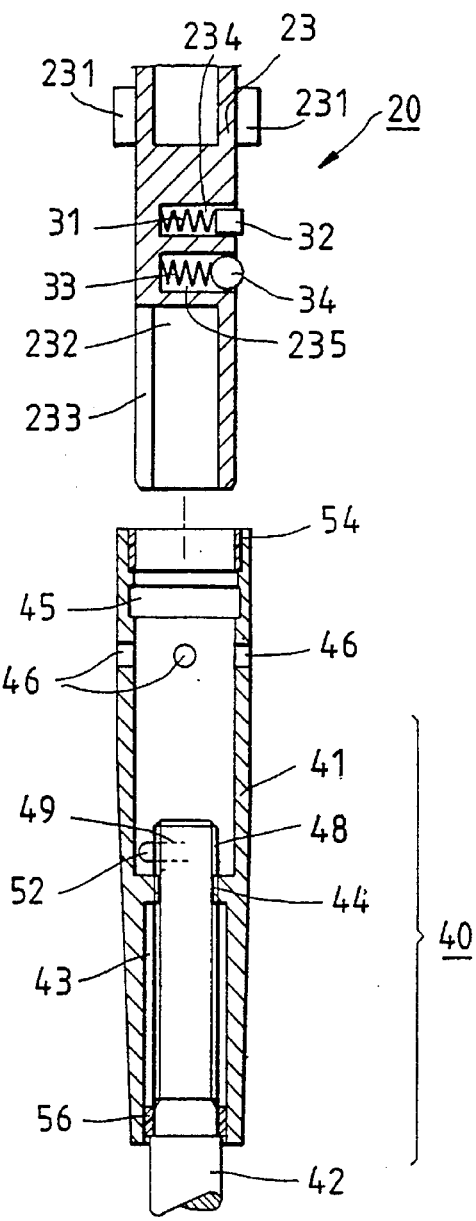
FIG. 4 shows a schematic view of the present invention in combination.

In combination, the outer threaded portion 48 of the support rod 42 is engaged with the inner threaded portion 44 of the adjustment rod 41, as shown in FIG. 4. A pin 52 is inserted into the circular hole 49 of the outer threaded portion 48 so as to ensure that the outer threaded portion 48 does not become disengaged with the inner threaded portion 44 when the support rod 42 and the adjustment rod 41 are loosened to be in the state of retreating. Thereafter, the inner rod 23 of the fastening member 20 is fitted into the fitting hole 43 of the adjustment rod 41 such that the pin 52 of the outer threaded portion 48 is received in the sliding slot 233 of the inner rod 23, as shown in FIG. 6. In the meantime, the retaining block 32 and the steel ball 34, which are located in the circular holes 234 and 235, are forced by the springs 31 and 33 to be retained in the retaining slot 45 and the through hole 46 of the adjustment rod 41, as shown in FIGS. 7 and 8. As a result, the adjustment rod 41 can not be disengaged with the inner rod 23. In other words, the adjustment rod 41 and the inner rod 23 can be rotated in relation to each other, thanks to the retaining block 32 which is inserted into the retaining slot 45 of the adjustment rod 41.

The support rod 42 of the present invention can be adjusted in length by turning the adjustment rod 41 as to cause the support rod 42 to displace up and down by the guiding effect of the outer threaded portion 48 of the support rod 42 and the inner threaded portion 44 of the adjustment rod 41. It must be noted here that the support rod 42 can not be caused to rotate in relation to the inner rod 23 when the adjustment rod 41 is turned, in view of the fact that the pin 52 of the support rod 42 is confined by the sliding slot 233 when the adjustment rod 41 is turned. For this reason, the support rod 42 is caused to move up and down in the axial direction when the adjustment rod 41 is turned.

When the adjustment rod 41 is turned for an angle of 90 degrees, the steel ball 34 is caused to be retained in another through hole 46 by a pressure exerting thereon. As a result, the length adjustment of the support rod 42 can be easily regulated by the extent to which the adjustment rod 41 is rotated.

Furthermore, it must be noted that the pivoting ring 54 of the adjustment rod 41 is fitted over the inner rod 23, and that the pivoting jacket 56 of the support rod 42 is fitted into the fitting hole 43 of the adjustment rod 41. As a result, the action of the axial rotation of the adjustment rod 41 in relation to the inner rod 23 can be brought about with ease and precision. In other words, the eccentric rotation of the adjustment rod 41 is averted.

The embodiment of the present invention described above is to be regarded in all respects as merely illustrative and not restrictive. Accordingly, the present invention may be embodied in other specific forms without deviating from the spirit thereof. The present invention is therefoe to be limited only by the scope of the following appended claims.

What is claimed is:

1. An adjustable bicycle parking frame comprising a fastening plate which is provided at a bottom thereof with an inner rod having thereon at a midpoint thereof two protuberances, a support rod, and an adjustment rod; wherein said inner rod is provided at a bottom thereof with a receiving space which is provided axially with a sliding slot and is further provided on a top thereof with a first round hole dimensioned to receive therein a spring and a retaining block; wherein said support rod is provided at a bottom thereof with a support block and at a top thereof with an outer threaded portion having on a top thereof a round hole in which a pin is received; wherein said adjustment rod is provided axially with a fitting hole having therein at a midpoint thereof an inner threaded portion engageable with said outer threaded portion of said support rod, said fitting hole of said adjustment rod further having on an inner wall of a top end thereof a retaining groove engageable with said retaining block of said inner rod when said fitting hole of said adjustment rod is fitted over a bottom end of said inner rod; and wherein said support rod can be adjusted in length by a relative displacement of said inner threaded portion of said adjustment rod and said outer threaded portion of said support rod, with said relative displacement being brought about by said adjustment rod which is turned.

2. The adjustable bicycle parking frame as defined in claim 1, wherein said inner rod is provided with a second round hole located between a top edge of said receiving space and said two protuberances, said second round hole receiving therein a spring and a steel ball; and wherein said fitting hole of said adjustment rod is provided therein equidistantly with a predetermined number of through holes corresponding in location to said second round hole of said inner rod for retaining and locating said steel ball.

3. The adjustable bicycle parking frame as defined in claim 1, wherein said fitting hole of said adjustment rod is provided therein at a top end thereof with a pivoting ring which is made of a plastic material and is fitted thereinto, said pivoting ring having an inner diameter greater than an outer diameter of said inner rod; and wherein said outer threaded portion of said support rod is provided at a bottom thereof with a pivoting jacket of a plastic material and having an outer diameter smaller than an inner diameter of said fitting hole of said adjustment rod.

\* \* \* \* \*